United States Patent [19]

Mizutani et al.

[11] Patent Number: 4,750,927
[45] Date of Patent: Jun. 14, 1988

[54] HEATING APPARATUS FOR DRAWING GLASS ROD

[75] Inventors: Futoshi Mizutani; Katsuzou Mukai; Tohru Kuwahara, all of Yokohama, Japan

[73] Assignee: Sumitomo Electric Industries, Ltd., Osaka, Japan

[21] Appl. No.: 78,847

[22] Filed: Jul. 28, 1987

[30] Foreign Application Priority Data

Aug. 7, 1986 [JP] Japan ................... 61-184302

[51] Int. Cl.4 ............................................ C03B 37/027
[52] U.S. Cl. ................................................ 65/13; 65/2; 277/237 A
[58] Field of Search .................. 277/237, 27; 65/12, 65/2, 3, 11, 13

[56] References Cited

U.S. PATENT DOCUMENTS

| | | | |
|---|---|---|---|
| 2,495,956 | 1/1950 | Cook | 65/13 X |
| 4,126,436 | 11/1978 | Bailey | 65/13 |
| 4,154,592 | 5/1979 | Bailey | 65/2 |
| 4,174,842 | 11/1979 | Partus | 65/2 X |
| 4,209,176 | 6/1980 | Soodak et al. | 277/12 X |
| 4,289,318 | 9/1981 | Cather et al. | 277/12 |
| 4,309,201 | 1/1982 | Klop et al. | 65/2 |
| 4,383,843 | 5/1983 | Lyengar | 65/2 |
| 4,477,274 | 10/1984 | Janssen et al. | 65/13 |

FOREIGN PATENT DOCUMENTS

| | | |
|---|---|---|
| 0132887 | 2/1985 | European Pat. Off. . |
| 0181040 | 5/1986 | European Pat. Off. . |
| 2249847 | 5/1975 | France . |
| 1523595 | 9/1978 | United Kingdom . |

Primary Examiner—Robert L. Lindsay
Attorney, Agent, or Firm—Cushman, Darby & Cushman

[57] ABSTRACT

A heating apparatus for drawing a glass rod having a tapered portion coupled, at its upper end, with a feed bar of an outside diameter smaller than that of the glass rod, including an apparatus housing into which the glass rod is inserted, a first sealing cover which is formed with a bore having such a dimension as to seal a clearance between the glass rod and the bore and is hermetically mounted on an inlet opening of the apparatus housing and a second sealing cover which is movably attached to the feed bar and is formed with an aperture having such a dimension as to seal a clearance between the feed bar and the aperture. The second sealing cover has a hollow portion which is formed with a space for accommodating the tapered portion and is hermetically placed, at its lower end, on the inlet opening.

6 Claims, 3 Drawing Sheets

Fig. 4
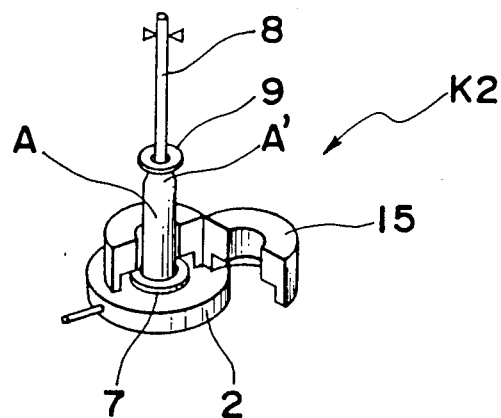
Fig. 5
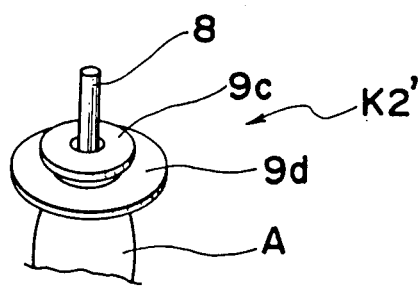
Fig. 6a  Fig. 6b
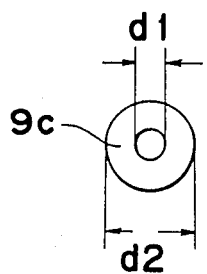
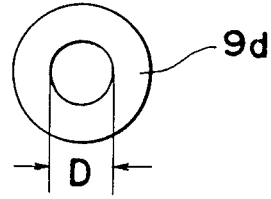
Fig. 7
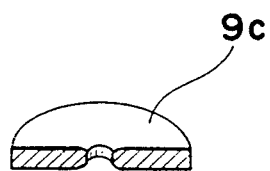

HEATING APPARATUS FOR DRAWING GLASS ROD

BACKGROUND OF THE INVENTION

The present invention relates to a compact heating furnace for drawing a long glass rod, which can be effectively used for drawing base material of optical fiber.

Conventionally, such a heating furnace as shown in FIG. 1 has been used for drawing a glass rod, for example, base material of optical fiber. This known heating furnace has a furnace body 21. A cylindrical inlet opening 22 for inserting base material A of optical fiber into the furnace body 21 is provided at a central portion of a top wall of the furnace body 21, while a cylindrical outlet opening 23 for dragging a drawn glass portion D out of the furnace body 21 is provided at a central portion of a bottom wall of the furnace body 21. A feed bar E for feeding the base material A to a heating element 26 in the furnace body 21 and a drag bar C for dragging the drawn glass portion D out of the furnace body 21 are, respectively, coupled with upper and lower ends of the base material A of optical fiber beforehand. A sealing cover 24, which is formed with a bore having such a dimension as to seal a clearance between the feed bar E and the bore, is hermetically placed on an upper end of the inlet opening 22. Meanwhile, supply ports 28 and 29 for supplying inert gas into the furnace body 21 are, respectively, provided at the inlet opening 22 and the outlet opening 23.

In the case where the base material A of optical fiber is drawn by using the known heating furnace of FIG. 1, a blind cover 24a is initially placed on the inlet opening 22. Then, in an open state of a gas exhaust vent 30 of a lower cover 25, inert gas is supplied into the furnace body 21 from the supply ports 28 and 29 by a supply device (not shown) for supplying inert gas so as to occupy atmosphere in the furnace body 21 such that excessive inert gas flows out of the gas exhaust vent 30. Subsequently, the heating element 26 in the furnace body 21 is heated to a predetermined temperature for drawing the base material A of optical fiber so as to be maintained at the predetermined temperature. Thereafter, in order to insert the base material A of optical fiber into the furnace body 21, the gas exhaust vent 30 of the lower cover 25 is closed. Then, after the blind cover 24a has been removed from the inlet opening 22, the base material A of optical fiber is inserted into the furnace body 21 and a lower end of the base material A is heated by the heating element 26. Subsequently, when the lower end of the base material A has been heated so as to be softened, the drag bar C is dragged downwardly so as to form the drawn glass portion D. Since the base material A of optical fiber is held at high temperatures during and after heating of the base material A, it is necessary to maintain atmosphere of inert gas in the furnace body 21.

However, when long base material of optical fiber is drawn by using the known heating furnace of FIG. 1, an upper end of the base material projects out of the inlet opening 22 provided at the top wall of the furnace body 21 and thus, it becomes impossible to hermetically seal the upper end of the inlet opening 22 by the sealing cover 24. Therefore, the cylindrical inlet opening 22 of the heating furnace is required to have a length necessary for accommodating therein the base material of optical fiber. Meanwhile, the feed bar E is also required to have a length sufficient for feeding the base material of optical fiber from the upper end of the inlet opening 22 towards the heating element 26, thereby resulting in difficult operation. Thus, the heating furnace as a whole becomes larger in height, thereby resulting in deterioration of its space factor. Furthermore, the known heating furnace has such a drawback that the long feed bar is required to be used, thus resulting in extreme deterioration of its working efficiency.

SUMMARY OF THE INVENTION

Accordingly, an essential object of the present invention is to provide a heating apparatus which is capable of drawing a long glass rod without the needs not only for making an apparatus housing larger in size but for making a feed bar larger in length, with substantial elimination of the disadvantages inherent in conventional heating apparatuses of this kind.

In order to accomplish this object of the present invention, a heating apparatus for drawing a glass rod, according to one preferred embodiment of the present invention comprises: an apparatus housing having an inlet opening, into which said glass rod is axially downwardly inserted from said inlet opening; said glass rod having a tapered portion formed at its upper end portion such that a diameter of said tapered portion decreases in an upward direction of said glass rod; said tapered portion being coupled, at its upper end, with a feed bar for feeding said glass rod into said apparatus housing; said glass rod having an outside diameter larger than that of said feed bar; a first sealing cover which is formed with a bore having such a dimension as to seal a clearance between an outer periphery of said glass rod and said bore and is hermetically mounted on said inlet opening; and a second sealing cover which is movably attached to said feed bar and is formed with an aperture having such a dimension as to seal a clearance between an outer periphery of said feed bar and said aperture; said second sealing cover having a hollow portion; said hollow portion being formed with a space for accommodating said tapered portion of said glass rod and being hermetically placed, at its lower end, on said first sealing cover.

In accordance with the present invention, when the glass rod is fed into the apparatus housing from the inlet opening and projects above the inlet opening, the first sealing cover having the glass rod passing therethrough maintains hermetic state in the apparatus housing by covering the inlet opening. Subsequently, upon progress of drawing of the glass rod through heating thereof, when the tapered portion disposed at the upper end of the glass rod passes through the first sealing cover and thereafter, hermetic state in the apparatus housing is maintained by the second sealing cover.

BRIEF DESCRIPTION OF THE DRAWINGS

This object and features of the present invention will become apparent from the following description taken in conjunction with the preferred embodiments thereof with reference to the accompanying drawings, in which:

FIG. 4 is a fragmentary perspective view of a heating furnace according to a second embodiment of the present invention;

FIG. 5 is a perspective view of a second sealing cover employed in a modification of the heating furnace of FIG. 4;

FIGS. 6a and 6b are views explanatory of the second sealing cover of FIG. 5; and FIG. 7 is a partly sectional fragmentary perspective view of the second sealing cover of FIG. 4.

Before the description of the present invention proceeds, it is to be noted that like parts are designated by like reference numerals throughout several views of the accompanying drawings.

DETAILED DESCRIPTION OF THE INVENTION

Figure 1:
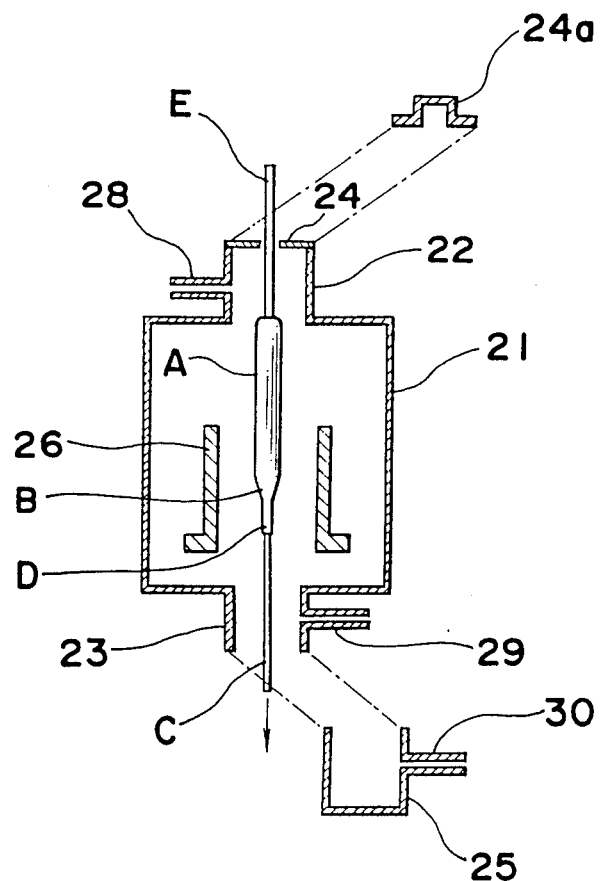
FIG. 1 is a schematic sectional view of a prior art heating furnace for drawing a glass rod (already referred to)
Figure 2:
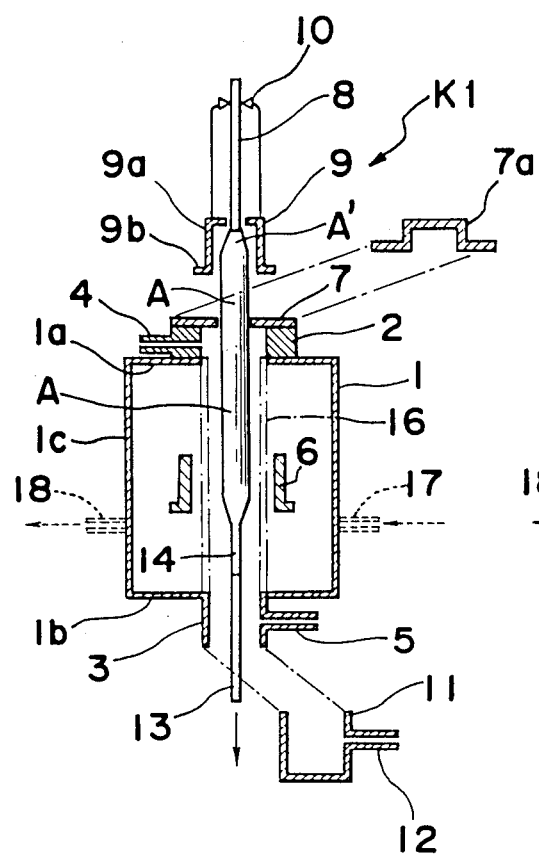
FIG. 2 is a schematic sectional view of a heating furnace for drawing a glass rod, according to a first embodiment of the present invention.

Referring now to the drawings, there is shown in FIG. 2, a heating furnace K1 for drawing a glass rod according to a first embodiment of the present invention, which is applied to base material of optical fiber. The heating furnace K1 includes a furnace body 1 having a top wall 1a, a bottom wall 1b and a side wall 1c. An inlet opening 2 for inserting base material A of optical fiber into the furnace body 1 is provided at a central portion of the top wall 1a, while an outlet opening 3 for dragging a drawn portion 14 of the base material A of optical fiber out of the furnace body 1 is provided at a central portion of the bottom wall 1b. A heating element 6 for heating and softening the base material A of optical fiber is provided in a space of the furnace body 1, which is enclosed by the top wall 1a, the bottom wall 1b and the side wall 1c.

In the present invention, since the base material A of optical fiber to be drawn is especially large in length, an upper portion of the base material A is so disposed as to project out of the inlet opening 2 when a distal end of the base material A is disposed at a central portion of the heating element 6 at the time of start of drawing the base material A. Therefore, in order to hermetically seal the inlet opening 2, a first sealing cover 7, which is formed with a bore having a such a dimension as to seal a clearance between an outer periphery of the base material A and the bore, is placed on the inlet opening 2. A feed bar 8 for feeding the base material A into the furnace body 1 and a drag bar 13 for dragging the drawn portion 14 of the base material A out of the furnace body 1 are beforehand coupled with upper and lower ends of the cylindrical base material A, respectively coaxially with the base material A. The base material A is formed, at its upper end, with a tapered portion A' having a diameter decreasing towards a coupling point between the base material A and the feed bar 8.

A second sealing cover 9 having a bell-like shape is preliminarily mounted, by using a mounting device 10, on the feed bar 8 of the base material A projecting above the inlet opening 2 so as to cover the tapered portion A' of the base material A. The second sealing cover 9 has a cylindrical portion 9a and a flange portion 9b provided at a lower end of the cylindrical portion 9a. The second sealing cover 9 is formed with an aperture having such a dimension as to seal a clearance between an outer periphery of the feed bar 8 and the aperture.

The base material A of optical fiber is heated so as to be drawn by the heating furnace K1 as follows. Initially, atmosphere in the furnace body 1 is occupied by inert gas and the heating element 6 is heated to a drawing temperature.

To this end, the inlet opening 2 is closed by a blind cover 7a and a lower cover 11 is mounted on the outlet opening 3. Then, inert gas, for example, nitrogen, argon or the like is supplied into the furnace body 1 from a supply port 4 of the inlet opening 2 and a supply port 5 of the outlet opening 3. In an open state of a gas exhaust vent 12 provided at the lower cover 11, atmosphere in the furnace body 1 is occupied by inert gas and supply of inert gas from the supply ports 4 and 5 into the furnace body 1 is continued.

Subsequently, in this state, the heating element 6 is heated to a predetermined drawing temperature and then, is maintained at the predetermined drawing temperature. Then, the blind cover 7a is removed from the inlet opening 2 while the outlet opening 3 is kept closed by the lower cover 11. Thereafter, the base material A having the feed bar 8 and the drag bar 13 coupled beforehand with its upper and lower ends, respectively is inserted from the inlet opening 2 into the furnace body 1 coaxially with the furnace body 1 and the heating element 6 so as to be set such that the lower end of the base material A is disposed at a central position of the heating element 6. In the present invention, since the base material A of optical fiber is especially large in length, the upper portion of the base material A projects out of the inlet opening 2 when the base material A is set in the furnace body 1. Thus, the first sealing cover 7, which passes the base material A therethrough so as to seal the clearance between the outer periphery of the base material A and the bore of the first sealing cover 7, is placed on the inlet opening 2 so as to maintain hermetic state in the furnace body 1. In this state, the base material A is heated so as to be softened and is drawn by dragging the drag bar 13 downwardly. When the base material A is supplied into the furnace body 1 in response to progress of drawing of the base material A, the flange portion 9b of the second sealing cover 9 having a bell-like shape is placed on an upper face of the first sealing cover 7 into close contact therewith. Hence, the second sealing cover 9 having a bell-like shape, which passes the feed bar 8 therethrough so as to seal the clearance between the outer periphery of the feed bar 8 and the aperture of the second sealing cover 9, maintains hermetic state in the furnace body 1. In this state, hermetic state in the furnace body 1 is maintained by the second sealing cover 9 even when the tapered portion A' of the base material A is being passed through the first sealing cover 7 upon further supply of the base material A into the furnace body 1. Upon further progress of drawing of the base material A, the feed bar 8 proceeds by passing through an upper end portion of the second sealing cover 9 such that the clearance between the outer periphery of the feed bar 8 and the aperture of the second sealing cover 9 is sealed by the second sealing cover 9, whereby hermetic state in the furnace body 1 is maintained.

Figure 3:
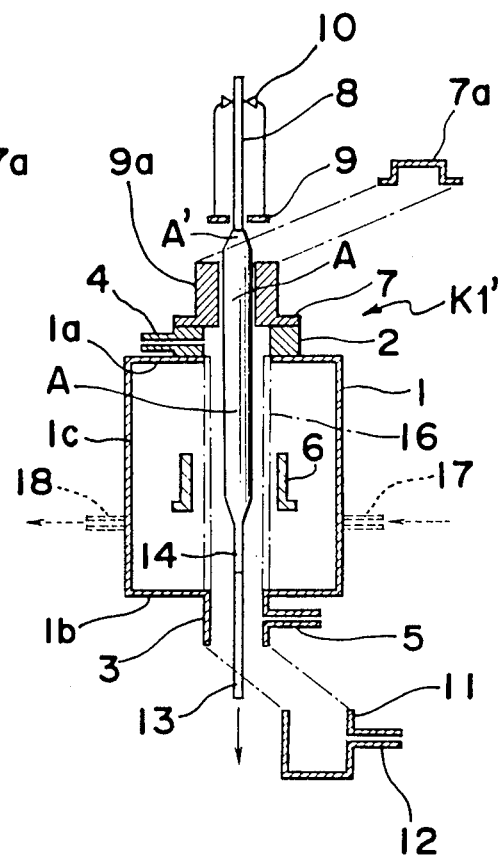
FIG. 3 is a view similar to FIG. 2, particularly showing a modification thereof.

The second sealing cover 9 is integrally formed with the cylindrical portion 9a in the heating furnace K1. However, it can also be so arranged that the first sealing cover 7 is integrally formed with the cylindrical portion 9a as shown in FIG. 3 depicting a modification K1' of the heating furnace K1.

FIG. 4 shows a portion of a heating furnace K2 according to a second embodiment of the present invention. The heating furnace K2 includes a first sealing cover 7, a cylindrical member 15 and a second sealing cover 9 which are formed separately from each other. The first sealing cover 7 is hermetically placed on the inlet opening 2 of the furnace body 1. The cylindrical member 15 defines therein a space for accommodating the tapered portion A' of the base material A and is longitudinally split into two halves. Meanwhile, the second sealing member 9 is preliminarily retained at a lower end of the feed bar 8 and then, is hermetically placed on an upper end of the cylindrical member 15 so as to seal a clearance between the outer periphery of the feed bar 8 and an aperture of the second sealing member 9.

Since the cylindrical member 15 is of split construction in the heating furnace K2, mounting and removal of the cylindrical member 15 can be performed easily. Meanwhile, the cylindrical member 15 is not necessarily required to be exactly cylindrical and can be replaced by a hollow member formed with a space not only for passing the base material A of optical fiber therethrough but also for accommodating the tapered portion A' of the base material A. Furthermore, the cylindrical member 15 is not required to be of split construction.

Meanwhile, in the heating furnace K2, the cylindrical member 15 is formed separately from the first sealing cover 7 and the second sealing cover 9. However, it can also be so arranged that the cylindrical member 15 is formed integrally with the first sealing cover 7 in the same manner as in the heating furnace K1' of FIG. 3. Furthermore, if a side wall of the cylindrical member 15 is formed with a cavity, it becomes possible to cool the cylindrical member 15 by supplying cooling medium into the cavity.

Furthermore, in the heating furnace K2, the second sealing cover 9 is formed by a single hollow disc but can be replaced by a set of a small disc 9c and a large disc 9d as shown in FIGS. 5, 6a and 6b depicting a modification K2' of the heating furnace K2. If the second sealing cover 9 is formed by a single hollow disc as in the heating furnace K2, such an undesirable phenomenon may take place that since the aperture of the second sealing cover 9 is of such a diameter as to seal the clearance between the outer periphery of the feed bar 8 and the aperture, feed of the second sealing cover 9 is stopped upon frictional contact between a side face of the feed bar 8 and the face of the aperture of the second sealing cover 9 even if the second sealing cover 9 is slightly inclined relative to the feed bar 8. If the second sealing cover 9 is not disposed in contact with the tapered portion A' of the base material A, for example, the second sealing cover 9 is retained in the course of the feed bar 8, hermetic state of the furnace body 1 cannot be maintained undesirably when hermetic state of the furnace body 1 is required to be maintained by the second sealing cover 9 and the cylindrical member 9 after the tapered portion A' of the base material A has passed through the cylindrical member 15.

Therefore, it is desirable as shown in FIGS. 5, 6a and 6b that the second sealing cover 9 is constituted by the small disc 9c having an inside diameter d1 and an outside diameter d2 and the large disc 9d having a large inside diameter D. The inside diameter d1 of the small disc 9c is of such a dimension as to seal the clearance between the outer periphery of the feed bar 8 and the inside diameter d1 for fitting the feed bar 8 thereinto. The inside diameter D of the large disc 9d is of such a dimension as to allow the large disc 9d to be retained at the tapered portion A' of the base material A. The large disc 9d has such an outside diameter as to cover an upper end of the cylindrical member 15.

Meanwhile, the diameters of the small disc 9c and the large disc 9d have the following relation.

$$(d2-d1)/2 > D-d1$$

By the above described relation, when the small disc 9c and the large disc 9d are overlapped each other so as to cover the upper end of the cylindrical member 15, such a phenomenon does not take place that a lateral clearance is formed between the small disc 9c and the large disc 9d due to positional deviation therebetween.

Furthermore, in the heating furnace K1 of FIG. 2, it can also be so arranged that the through-hole portion of the second sealing cover 9 having a bell-like shape is of such a two-piece construction as described above.

Moreover, the through-hole of the small disc 9c is of such a dimension as to form a quite small sealing clearance between the feed bar 8 and the through-hole. Thus, if the through-hole of the small disc 9c is formed angularly, such an undesirable phenomenon frequently takes place that the feed bar 8 is frictionally retained by the through-hole of the small disc 9c with the result that the small disc 9c does not seal the upper end of the cylindrical member 15. Accordingly, it is desirable that each of opposite edges of the through-hole of the small disc 9c is formed into a round shape having no angular portion as shown in FIG. 7. In the same manner as described above, it is desirable that each of opposite edges of the through-hole of the second sealing cover 9 of the heating furnace K1 of FIG. 2 is formed into a round shape.

Meanwhile, as illustrated in FIG. 2, if a pipe 16 shown by one-dot chain lines is provided at a center of the furnace body 1 so as to enclose the base material A of optical fiber and a gas inlet port 17 and a gas exhaust vent 18 for introducing into and discharging out of the furnace body 1 inert gas, respectively, which are shown by dotted lines, are provided at the side wall 1c of the furnace body 1, service life of the heating member 6 can be increased further.

As is clear from the foregoing description, when a long glass rod is drawn by the heating furnace of the present invention, hermetic state in the furnace body can be maintained in two steps by using the first sealing cover, the second sealing cover and the hollow member. Therefore, the long glass rod can be drawn through heating thereof by the compact heating furnace without the need for using a heating furnace having a large height in accordance with the length of the long glass rod. Furthermore, in the heating furnace of the present invention, since the feed bar for feeding the glass rod into the furnace body can be made short in length, working efficiency of the heating furnace has been improved remarkably. Consequently, in accordance with the present invention, production cost of the heating furnace as a whole is reduced drastically, thereby resulting in reduction of production cost of its products.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A heating apparatus for drawing a glass rod, comprising:
   an apparatus housing having an inlet opening, into which said glass rod is axially downwardly inserted from said inlet opening;
   said glass rod having a tapered portion formed at its upper end portion such that a diameter of said tapered portion decreases in an upward direction of said glass rod;
   said tapered portion being coupled, at its upper end, with a feed bar for feeding said glass rod into said apparatus housing;
   said glass rod having an outside diameter larger than that of said feed bar;
   a first sealing cover which is formed with a bore having such a dimension as to seal a clearance between an outer periphery of said glass rod and said bore and is hermetically mounted on said inlet opening; and
   a second sealing cover which is movably attached to said feed bar and is formed with an aperture having such a dimension as to seal a clearance between an outer periphery of said feed bar and said aperture;
   said second sealing cover having a hollow portion;
   said hollow portion being formed with a space for accommodating said tapered portion of said glass rod and being hermetically placed, at its lower end, on said first sealing cover.

2. A heating apparatus for drawing a glass rod, comprising:
   an apparatus housing having an inlet opening, into which said glass rod is axially downwardly inserted from said inlet opening;
   said glass rod having a tapered portion formed at its upper end portion such that a diameter of said tapered portion decreases in an upward direction of said glass rod;
   said tapered portion being coupled, at its upper end, with a feed bar for feeding said glass rod into said apparatus housing;
   said glass rod having an outside diameter larger than that of said feed bar;
   a first sealing cover which is formed with a bore having such a dimension as to seal a clearance between an outer periphery of said glass rod and said bore and is hermetically mounted on said inlet opening; and
   a second sealing cover which is movably attached to said feed bar and is formed with an aperture having such a dimension as to seal a clearance between an outer periphery of said feed bar and said aperture;
   said first sealing cover having a hollow portion;
   said hollow portion being formed with a space for accommodating said tapered portion of said glass rod and being capable of being sealed at its upper end by said second sealing cover.

3. A heating furnace for drawing a glass rod, comprising:
   an apparatus housing having an inlet opening, into which said glass rod is axially downwardly inserted from said inlet opening;
   said glass rod having a tapered portion formed at its upper end portion such that a diameter of said tapered portion decreases in an upward direction of said glass rod;
   said tapered portion being coupled, at its upper end, with a feed bar for feeding said glass rod into said apparatus housing;
   said glass rod having an outside diameter larger than that of said feed bar;
   a first sealing cover which is formed with a bore having such a dimension as to seal a clearance between an outer periphery of said glass rod and said bore and is hermetically mounted on said inlet opening;
   a hollow member which is formed with a space for accommodating said tapered portion of said glass rod and seals, at its lower end, said inlet opening; and
   a second sealing cover which is formed with an aperture having such a dimension as to seal a clearance between an outer periphery of said feed bar and said aperture and is movably attached to said feed bar and is capable of being placed on an upper end of said hollow member.

4. A heating furnace as claimed in claim 3, wherein said hollow member is longitudinally split into two half portions.

5. A heating apparatus as claimed in claim 3, wherein said second sealing cover is constituted by a first annular member and a second annular member having an inside diameter larger than that of said first annular member.

6. A heating apparatus as claimed in claim 5, wherein the following relation is satisfied:

$$(d_2 - d_1)/2 > D - d_1$$

where characters $d_1$, $d_2$ and $D$ denote the inside diameter of said first annular member, an outside diameter of said first annular member and the inside diameter of said second annular member, respectively.

* * * * *